G. H. LINDSEY.
ELECTRIC RAILROAD BONDING SYSTEM.
APPLICATION FILED MAY 26, 1909.
962,966.
Patented June 28, 1910.
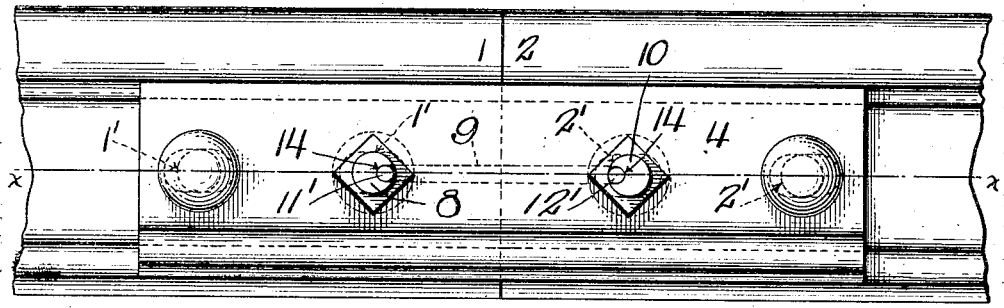
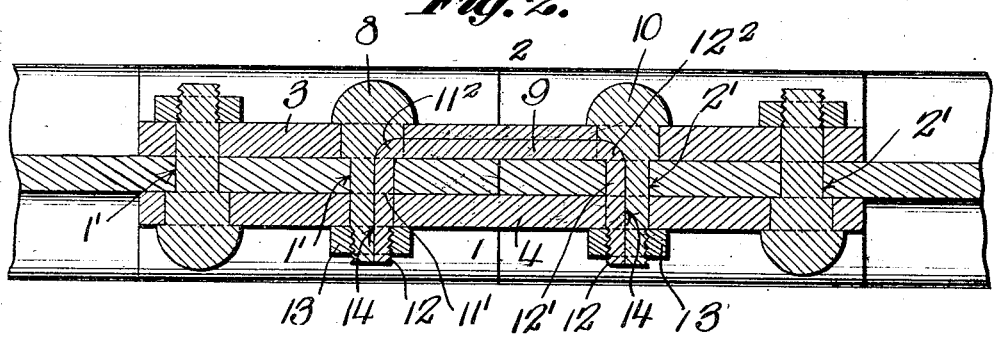
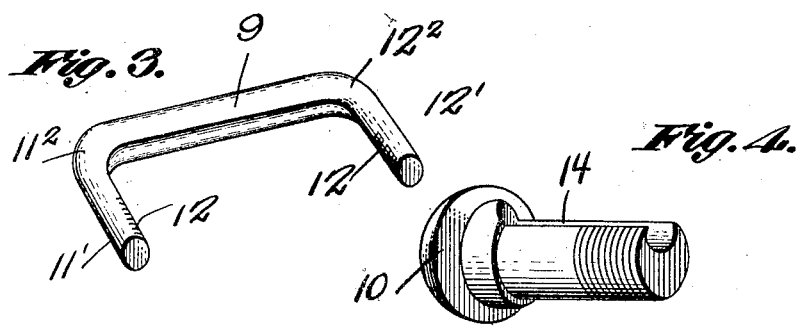
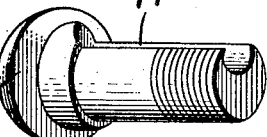
Inventor
George H. Lindsey,
Witnesses
Chas. E. Richardson
William S. McDowell.
By Victor J. Evans
Attorney

UNITED STATES PATENT OFFICE.

GEORGE H. LINDSEY, OF AUSTEN, WEST VIRGINIA.

ELECTRIC-RAILROAD BONDING SYSTEM.

962,966.  Specification of Letters Patent.  Patented June 28, 1910.

Application filed May 26, 1909. Serial No. 498,529.

*To all whom it may concern:*

Be it known that I, GEORGE H. LINDSEY, a citizen of the United States, residing at Austen, in the county of Preston and State of West Virginia, have invented new and useful Improvements in Electric - Railroad Bonding Systems, of which the following is a specification.

This invention relates to bonds for connecting electrical conductors, as rails which are used for return current.

The object is to provide a device of this character which is simple and easy of application, and which will not be liable to displacement.

The invention consists in the various details described and claimed hereinafter, and illustrated in the drawing forming part of this specification, in which, Figure 1 is a side elevation of the joined ends of two rails showing the application of my invention, Fig. 2, is a plan view partly in section on the line x—x of Fig. 1, Fig. 3 is a perspective view of one of the bonds. Fig. 4 is an enlarged view of the bolts.

In the drawings 1 and 2 represent the meeting ends of two rails, and 3 and 4 the splice bars. These rails are provided with the usual bolt openings 1' and 2'. Each of the two bolts 8 and 10 nearest the joint of the rails is provided with a longitudinal groove 14 to receive one of the parallel arms of the U-shaped bond 9. Partial threads 12 are cut on the inner faces of the arms 11' and 12' of the bond which aline with the threads of the bolts, and form continuous threads for the nuts 13. The splice bar 3 is provided with a groove 5 ex. nding from the opening 6 to the opening 7. The connecting member of the bond 9 is adapted to lie within the groove 5 so that the bar 4 will lie flush against the webs of the rails.

To apply the bond, the rail joint is made, the arms 11' and 12' inserted in the bolt openings so that said bond straddles the joint of the rails. The bolts 8 and 10 are then inserted in such manner that the arms 11' and 12' enter the grooves 14 in the bolts, the elbows 11² and 12² of the bond abutting against the walls at the inner ends of said grooves. The nuts 13 are then applied to the bolts and screwed home, the threads engaging the threads of the bolts and the arms of the bond and securing a firm engagement.

The bond cannot become loose from the free ends for the reason that the nuts hold same, nor from the inner end because the elbows abut against the end walls of the grooves. The groove 5 in the splice bar also insures against vertical movement.

It will thus be seen that a very efficient bond is secured.

Having thus described the invention what is claimed as new is:—

1. In a device of the class described a splice bar having a longitudinal groove extending between two bolt openings, a U-shaped bond having its connecting member fitted in said groove, the arms of said bond being partially threaded upon their inner faces, connecting bolts having grooves to receive the arms of the bond, and nuts threaded upon the bolts and bond arms.

2. In a device of the class described and including abutting rail ends and splice bars engaging the same, one of said splice bars being provided with a longitudinal groove extending between two bolt holes proximate to the rail joint, a U-shaped bond having its connecting member fitted in said groove and arms extending through the bolt holes, said arms being partially threaded upon their inner faces, bolts longitudinally grooved to engage the bond arms, and nuts threaded upon the bolts and the bond arms jointly.

In testimony whereof I affix my signature in presence of two witnesses.

GEORGE H. LINDSEY.

Witnesses:
 CLINT WILES,
 W. S. MONTGOMERY.